United States Patent [19]

Breitschwerdt et al.

[11] 4,225,069
[45] Sep. 30, 1980

[54] ARRANGEMENT FOR THE ACCOMMODATION OF WINTER SPORT EQUIPMENT OBJECTS ON A MOTOR VEHICLE ROOF

[75] Inventors: Werner Breitschwerdt, Stuttgart; Andreas Langenbeck, Sindelfingen, both of Fed. Rep. of Germany

[73] Assignee: Daimler-Benz Aktiengesellschaft, Fed. Rep. of Germany

[21] Appl. No.: 919,838

[22] Filed: Jun. 28, 1978

[30] Foreign Application Priority Data

Jul. 1, 1977 [DE] Fed. Rep. of Germany ....... 2729767

[51] Int. Cl.² ............................................... B60R 9/12
[52] U.S. Cl. .................................... 224/328; 224/319; 211/60 SK; 280/814; 312/294
[58] Field of Search ....................... 224/42.1 E, 42.1 F, 224/42.1 D, 42.1 R, 42.45 R, 42.42 R, 42.46 R, 29 R, 42.43, 42.44, 42.03 R, 42.01, 45 S, 5 Z, 273, 328, 319; 280/11.37 K, 11.37 A; 211/60 SK, 4, 8, 64, 67, 68, 60 R, 60 T, 60 G; 312/231, DIG. 33, 233, 294, 295, 128, 129, 136, 130

[56] References Cited

U.S. PATENT DOCUMENTS

| 267,428 | 11/1882 | Henrichs | 312/136 X |
| 1,668,659 | 5/1928 | Rodgers et al. | 312/136 |
| 2,125,856 | 8/1938 | De Witt | 312/295 UX |
| 3,967,869 | 7/1976 | Jackson | 312/DIG. 33 |
| 4,071,176 | 1/1978 | Tuzee | 211/60 SK X |
| 4,084,735 | 4/1978 | Kappas | 224/42.1 E |
| 4,091,918 | 5/1978 | Soulakis | 312/294 X |

FOREIGN PATENT DOCUMENTS 2024368 2/1972 Fed. Rep. of Germany ...... 224/42.1 E

Primary Examiner—Robert J. Spar
Assistant Examiner—Jerold M. Forsberg
Attorney, Agent, or Firm—Craig & Antonelli

[57] ABSTRACT

An arrangement for the accommodation of winter sport equipment items, such as skis and accessories, e.g., ski poles and ski boots, on carriers secured to the roof of a motor vehicle. Two luggage-like containers disposed adjacent one another are thereby arranged on the carriers, of which one is provided on the inside with mounting supports for skis and is open toward the rear while the other is constructed for receiving ski poles and ski boots.

10 Claims, 4 Drawing Figures

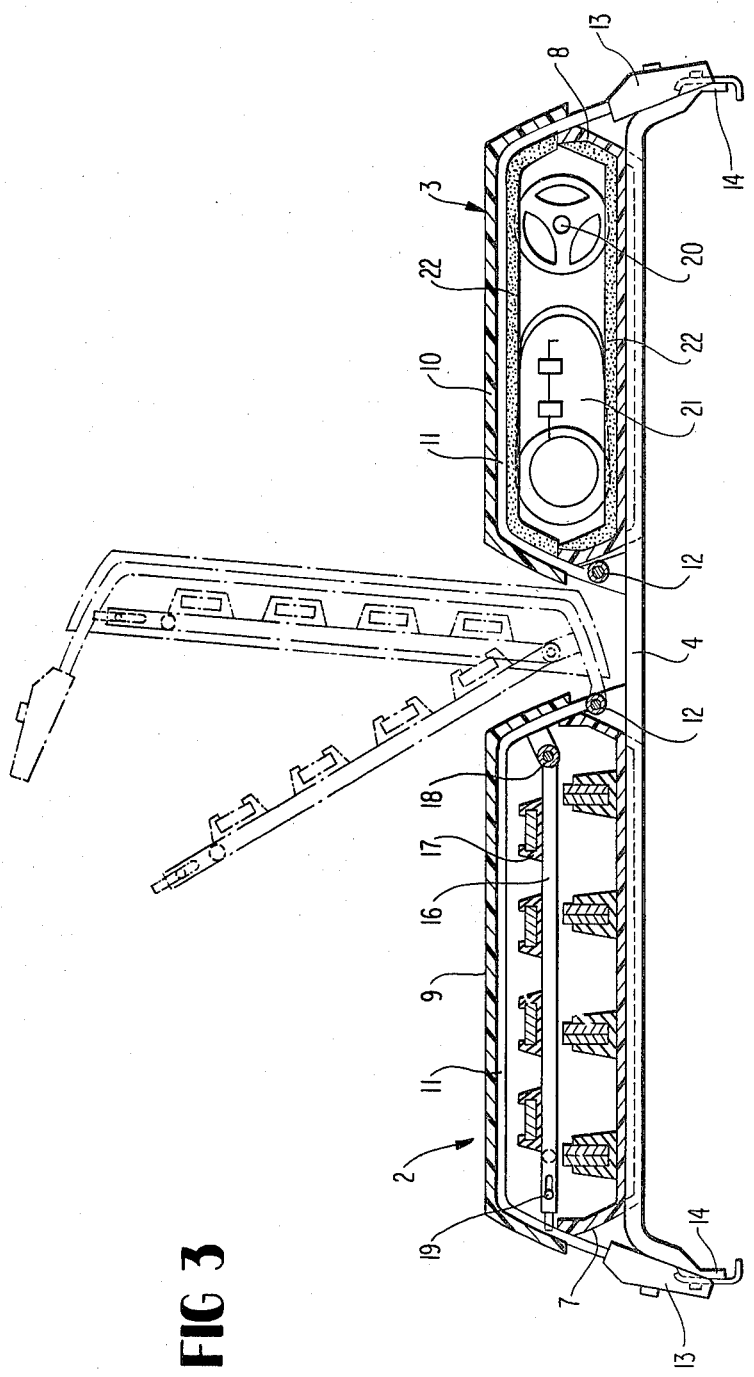
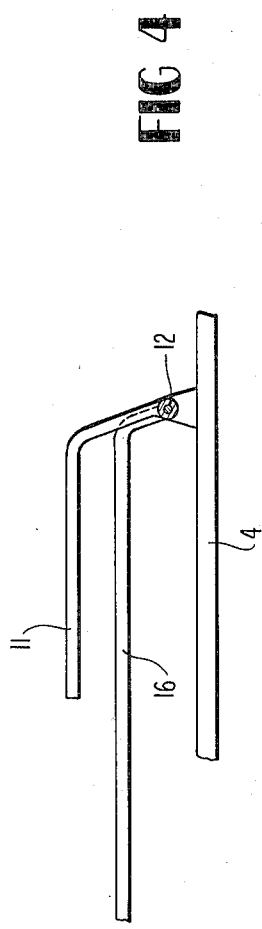
FIG 3
FIG 4

ARRANGEMENT FOR THE ACCOMMODATION OF WINTER SPORT EQUIPMENT OBJECTS ON A MOTOR VEHICLE ROOF

The present invention relates to an arrangement for the accommodation of winter sports equipment, especially for skis and accessories, on two carriers secured at a roof of a motor vehicle.

Skis were arranged heretofore on separate ski carriers, possibly ski carriers adapted to be locked, which are secured at the roof of a motor vehicle, whereas the accessories, for example, the ski poles and the ski shoes, as a rule are arranged in the luggage space. Insofar as roof suitcases are used for storing the travel luggage, when skis are taken along, separate ski carriers are disposed on the roof suitcase.

The present invention is concerned with the task to provide an arrangement, in which the skis and also the accessories taken along, can be protected against theft and in which no driving air noises occur during a fast drive.

The underlying problems are solved according to the present invention by two luggage-like containers disposed adjacent one another which are arranged on the carriers, of which one is provided on the inside thereof with holders or mounting means for skis and is open at the rear end, and the other is constructed for the accommodation of ski poles and ski boots.

A safe accommodation of skis and of the associated accessory articles so that no noise will be produced is achieved by the arrangement of two luggage-like containers, whereby a different task is ascribed to each container. Additionally, a good accessibility to the containers is achieved because the interior space of each container can be reached in its entirety from a vehicle side. Added thereto is the fact that a streamlined and aesthetically favorable form can be imparted to the containers. By reason of the fact that the container for the accommodation of the skis is open toward the rear, also possible to transport very long skis.

In an advantageous construction of the inventive subject matter, each container may consist of a lower shell fastened on the carriers and of an upper shell which is pivotally connected about an axis disposed in the longitudinal direction of the vehicle. Each upper shell may thereby be fastened on two curved pivotal support members extending inside of the upper shell and each curved pivotal support member, on the one hand, may be secured at a carrier by means of hinges disposed in the pivot axis and, on the other hand, may be adapted to be latched with the carrier while covering the fastening means of the carrier and to be locked with respect to the carrier. As a structural result of this construction, a relief of the lower shell from the upper shell takes place. The hinge means, the locking means, and the securing means may be constructed particularly strong.

Ski grippers secured at the carriers may be arranged in the lower shell of the container for the accommodation of skis. Moreover, a mounting or retaining frame with ski grippers for the mounting and retention of additional skis may be arranged in the associated upper shell.

In order to achieve a good accessibility, the mounting frame may be arranged so as to be pivotal with respect to the upper shell. In that connection, the mounting frame may be pivotally connected at the curved pivotal support members of the upper shell or at the hinges for the curved pivotal support members.

The interior of the container for the accommodation of ski poles and ski shoes may be lined with foamed rubber or the like in order that the accessory objects do not cause any noise during transportation and are fixed in their transported position.

Accordingly, it is an object of the present invention to provide an arrangement for the accommodation of winter sports equipment on a motor vehicle roof which avoids by simple means the aforementioned shortcomings and drawbacks encountered in the prior art.

Another object of the present invention resides in a simple and meaningful arrangement for the accommodation of winter sports equipment on a motor vehicle roof which protects the winter sport equipment such as skis and accessories against external climatic influences as well as against theft.

A further object of the present invention resides in an arrangement for the accommodation of winter sports equipment objects on motor vehicle roofs which offers a simple structural arrangement for carrying along these objects without causing any wind noises when driving fast on an open highway.

Still another object of the present invention resides in an arrangement of the type described above in which containers carried on the roof of the vehicel are readily accessible and capable of accepting a relatively large number of objects, especially relatively long skis.

These and other objects, features and advantages of the present invention will become more apparent from the following description when taken in connection with the accompanying drawing which shows, for purposes of illustration only, two embodiments in accordance with the present invention and wherein:

FIG. 3 is a cross-sectional view, on an enlarged scale, through the arrangement of FIGS. 1 and 2, taken along line III—III of FIG. 2; and FIG. 4 is a partial elevational view illustrating a modified embodiment of the pivotal connection of a mounting frame in the container for the accommodation of the skis in accordance with the present invention, which differs from FIG. 3.

Figure 1:
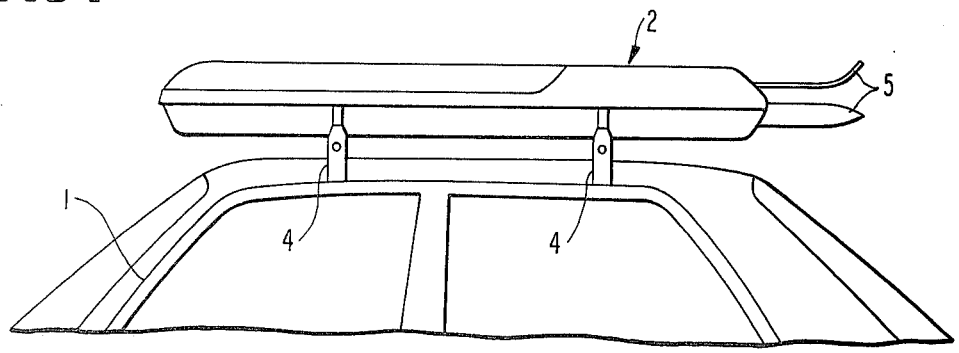
FIG. 1 is a partial side elevational view of the arrangement for the accommodation of winter sports equipment on the roof of a motor vehicle in accordance with the present invention.
Figure 2:
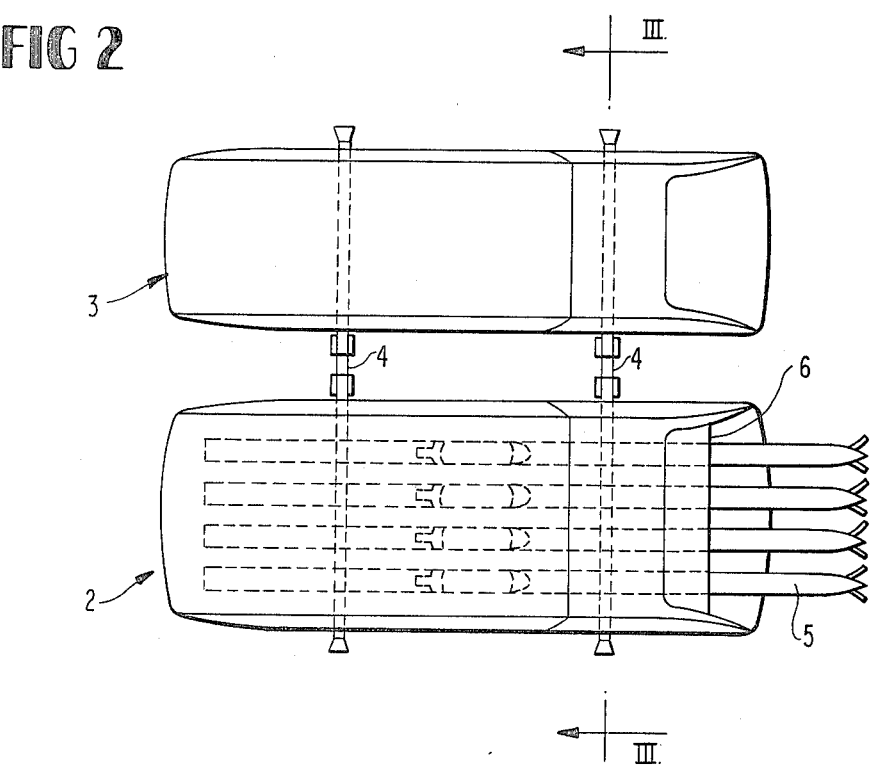
FIG. 2 is a plan view on the arrangement of FIG. 1.

Referring now to the drawings wherein like reference numerals are used throughout the various views to designate like parts, and more particularly to FIGS. 1 and 2, two luggage-like containers generally designated by reference numerals 2 and 3 are arranged on the roof of a motor vehicle 1, which are supported by carriers or supports 4. The carriers 4, in turn, are secured in the usual manner at the lateral rain channels of the roof. Both containers 2 and 3, which are preferably made of synthetic plastic material, are disposed in the longitudinal direction of the vehicle. The container 2 which serves for the accommodation of skis 5, is thereby somewhat wider than the container 3 which is constructed for the accommodation of accessory objects such as, for example, ski poles and ski boots. Whereas the container 3 is closed on all sides, the container 2 includes an opening 6 pointing toward the rear, through which the forward ends of the skis 5 project out of the container 2.

As can be seen more fully from FIG. 3, the carriers 4 extend into corresponding recesses of the containers 2 and 3 which are formed by lower shells 7 and 8 mounted respectively to upper shells 9 and 10.

Both upper shells 9 and 10 of the containers 2 and 3 are mounted on curved pivotal support members 11 which are pivotally connected at the carriers 4 within the area of the vehicle center by means of hinges 12 disposed outside of the containers. The other ends of the curved pivotal support members 11 also project out of the containers and are provided with latching and locking means which securingly cover the fastening means 14 of the carriers 4 at the roof of the vehicle.

Ski grippers 15 are provided in the container 2 for the accommodation of the skis 5, which are secured in the lower shell 7 at the carriers 4. For the additional accommodation of skis 5, a support or mounting frame 16 with additional ski grippers 17 is arranged in the upper shell 9, which is pivotally connected by means of hinges 18 to the curved pivot support members 11 and which is detachably engaged at the other end by means of latches 19 to the curved pivotal support members 11.

For removing the skis 5 out of the ski grippers 15, the latching and locking means 13 are opened up and the curved pivotal support members 11 together with the upper shell 9 are pivoted up about the hinges 12 so that the upper shell 9 assumes the position illustrated in dash and dotted lines. If thereafter skis are to be removed out of the ski grippers 17, then the latches 19 are opened up and the mounting frame 16 is pivoted downwardly about the hinges 18, as is indicated by the dash line.

The container 3 for the accommodation of ski poles 20 and ski boots 21 includes a lining 22 of thick layers of foamed rubber for fixing these objects in the lower shell 8 and in the upper shell 10.

FIG. 4 illustrates that the mounting frame 16, instead of being pivotally connected by means of separate hinges 18 according to FIG. 3, may also be pivotally connected directly at the hinges 12 for the curved pivotal support members 11.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for the accommodation of winter sports equipment on two carrier means secured on a roof of a motor vehicle, characterized in that two luggage-like container means disposed adjacent one another are arranged on the carrier means, of which one container means is provided on the inside with mounting support means for skis and is open at one side thereof while the other container means is constructed for receiving accessories, each of said container means comprising a lower shell secured on the carrier means and an upper shell which is pivotally connected about an axis disposed substantially in the longitudinal direction of the vehicle, each upper shell being secured at two curved pivotal support members extending within the upper shell, and each pivotal support member being secured at a carrier means by hinge means disposed in the pivot axis and being adapted to be latched with the carrier means and to be locked with respect to the carrier means while covering the fastening means of the carrier means, said arrangement further comprising ski gripper means secured at the carrier means and arranged in the lower shell of the container means for the accommodation of skis, and a mounting frame means also having ski gripper means for the mounting of skis arranged in the upper shell of the container means, said mounting frame means being arranged so as to be pivoted out relative to the upper shell of said container means.

2. An arrangement according to claim 1, characterized in that the accessories include ski poles and ski boots.

3. An arrangement according to claim 1, characterized in that the mounting frame means is pivotally connected at the support members of the upper shell.

4. An arrangement according to claim 1, characterized in that the mounting frame means is pivotally connected at the hinge means for the support members of the upper shell.

5. An arrangement according to claim 1, characterized in that the interior of the container means for the accommodation of the accessories is lined out with foamed rubber or the like.

6. An arrangement for the accommodation of winter sports equipment on two carrier means secured on a roof of a motor vehicle, characterized in that two luggage-like container means disposed adjacent one another are arranged on the carrier means, of which one container means is provided on the inside with mounting support means for skis and is open at one side thereof while the other container means is constructed for receiving accessories, each of said container means comprising a lower shell secured on the carrier means and an upper shell which is pivotally connected about an axis disposed substantially in the longitudinal direction of the vehicle, said arrangement further comprising a mounting frame means with ski gripper means for the mounting of skis arranged in the upper shell of the container means, said mounting frame means being arranged so as to be pivoted out relative to the upper shell of the container means.

7. An arrangement for the accommodation of winter sports equipment on two carrier means secured on a roof of a motor vehicle, characterized in that two luggage-like container means disposed adjacent one another are arranged on the carrier means, of which one container means is provided on the inside with mounting support means for skis and is open at one side thereof while the other container means is constructed for receiving accessories, each of said container means comprising a lower shell secured on the carrier means and an upper shell which is pivotally connected about an axis disposed substantially in the longitudinal direction of the vehicle, said arrangement further comprising a mounting frame means with ski gripper means for the mounting of skis arranged in the upper shell of the container means, said mounting frame means being pivotally connected at the support members of the upper shell.

8. An arrangement for accommodation of winter sports equipment on two carrier means secured on a roof of a motor vehicle, characterized in that two luggage-like container means disposed adjacent one another are arranged on the carrier means, of which one container means is provided on the inside with mounting support means for skis and is open at one side thereof while the other container means is constructed for receiving accessories, each of said container means comprising a lower shell secured on the carrier means and an upper shell which is pivotally connected about an axis disposed substantially in the longitudinal direction of the vehicle, said arrangement further comprising a mounting frame means with ski gripper means for the mounting of skis arranged in the upper shell of the container means said mounting frame means being pivotally connected at the hinge means for the support members of the upper shell.

9. An arrangement according to claim 1, 6, 7, or 8, characterized in that the interior of the container means for the accommodation of the accessories is lined out with foamed rubber or the like.

10. An arrangement for the accommodation of winter sports equipment on two carrier means secured on a roof of a motor vehicle, characterized in that two luggage-like container means disposed adjacent one another are arranged on the carrier means, of which one container means is provided on the inside with mounting support means for skis and is open at one side thereof while the other container means is constructed for receiving accessories, each of said container means comprising lower and upper shells connected together, said arrangement further comprising a mounting frame means having ski gripper means for the mounting of skis arranged in the upper shell of the container means, said mounting frame means being arranged so as to be pivoted out relative to the upper shell of said container means.

* * * * *